United States Patent [19]

Lewis

[11] Patent Number: 5,207,787
[45] Date of Patent: May 4, 1993

[54] VARIABLE AREA NOZZLE

[75] Inventor: William J. Lewis, Somerset, United Kingdom

[73] Assignee: Rolls-Royce plc, Bristol, England

[21] Appl. No.: 356,914

[22] Filed: Feb. 23, 1982

[30] Foreign Application Priority Data

Feb. 28, 1981 [GB] United Kingdom ............... 8106397

[51] Int. Cl.$^5$ ............................................. B05B 12/00
[52] U.S. Cl. ................................................. 239/265.39
[58] Field of Search ........................ 60/228, 230, 232; 239/265.19, 265.33, 265.37, 265.39, 265.41

[56] References Cited

U.S. PATENT DOCUMENTS

| | | | |
|---|---|---|---|
| 2,831,321 | 4/1958 | Laucher . | |
| 3,564,934 | 2/1971 | McMurtry | 239/265.39 |
| 3,897,907 | 8/1975 | Colley | 239/265.39 |
| 4,049,198 | 9/1977 | Maurer | 239/265.39 |
| 4,141,501 | 2/1979 | Nightingale | 239/265.39 |
| 4,280,660 | 7/1981 | Wooten, Jr. et al. | 239/265.39 |
| 4,420,932 | 12/1983 | Merden et al. | 239/265.39 |

FOREIGN PATENT DOCUMENTS

| | | |
|---|---|---|
| 1367046 | 7/1963 | France . |
| 0940133 | 6/1964 | France . |
| 947557 | 1/1964 | United Kingdom . |

Primary Examiner—Charles T. Jordan
Attorney, Agent, or Firm—Oliff & Berridge

[57] ABSTRACT

A variable area nozzle for a turbomachine comprising, a duct 25 at least one wall of which is defined by a fixed portion 26 and two movable plates 29,30 located downstream of a downstream edge of the fixed portion 26. A first of the plates 29 is movable in a direction along the duct 25 relative to the fixed portion 26 and a second of the plates 30 is pivotally mounted at its upstream end on a downstream end of the first plate 29. An outer wall 34 surrounding the panels 29,30 extends downstream beyond the said downstream edge of the fixed portion 26. A seal plate 36 pivotally attached to the outer wall downstream of the downstream edge of the said fixed portion 26 is pivotally attached to one or more of the plates 29,30 and the seal plate 36 together with the plates 29,30 and the outer wall 34 define a pressurizable chamber 41 on that side of the plates 29,30 remote from the interior of the nozzle. Pressurized gas is admitted to the chamber 41 to counterbalance partially the loads on the panels 29,30 due to the pressure of the gases which flow through the nozzle. An actuator means 38,39 is provided to move the first plate 29 along the duct 25 and thereby cause the second plate 30 and seal plate 36 to pivot and vary the area of the nozzle. Further plates 31,37 may be provided downstream of the plates 29.

10 Claims, 2 Drawing Sheets

VARIABLE AREA NOZZLE

DESCRIPTION

THIS INVENTION relates to variable area nozzles for turbo-machines and is particularly, although not exclusively, concerned with nozzles that can be swivelled to vary the direction of thrust produced by the turbomachine.

Afterburning or reheat is a method of augmenting the basic thrust of a gas turbine engine and comprises the introduction and burning of additional fuel between the engine turbine and the jet pipe nozzle utilizing the unburnt oxygen in the exhaust gases to support the combustion.

Also, with engines such as the Rolls-Royce Limited's Pegasus engine in which cold by-pass air is discharged from vectorable "cold" nozzles, it is known to burn additional fuel in the air stream supplied to the nozzles to increase thrust. This is commonly referred to as plenum chamber burning (P.C.B.).

In both reheat and P.C.B. modes of operation, it is necessary to be able to increase the outlet area of the respective nozzle, to give an area suitable for the resultant increase in the volume of the gas stream to prevent any increase in pressure occurring that would otherwise affect the efficient functioning of the engine. The actual area of the nozzle is dictated by many factors which affect the mass flow of air through the engine, such as for example, altitude, ambient temperature, forward speed of the aircraft, and speed of the engine.

With nozzles that are swivellable, the mechanism for varying the area of the outlet must be simple to operate, capable of being operated independently of the mechanism for swivelling the nozzle, robust, and lightweight so as not to impose unacceptable loads on the mechanism for supporting and swivelling the nozzle.

The invention as claimed provides a variable area nozzle for a turbomachine, which is simple to operate, robust and lightweight. The nozzle is also suited for use as a swivellable nozzle.

The invention will now be described by way of examples with reference to the accompanying drawings in which.

Figure 1:
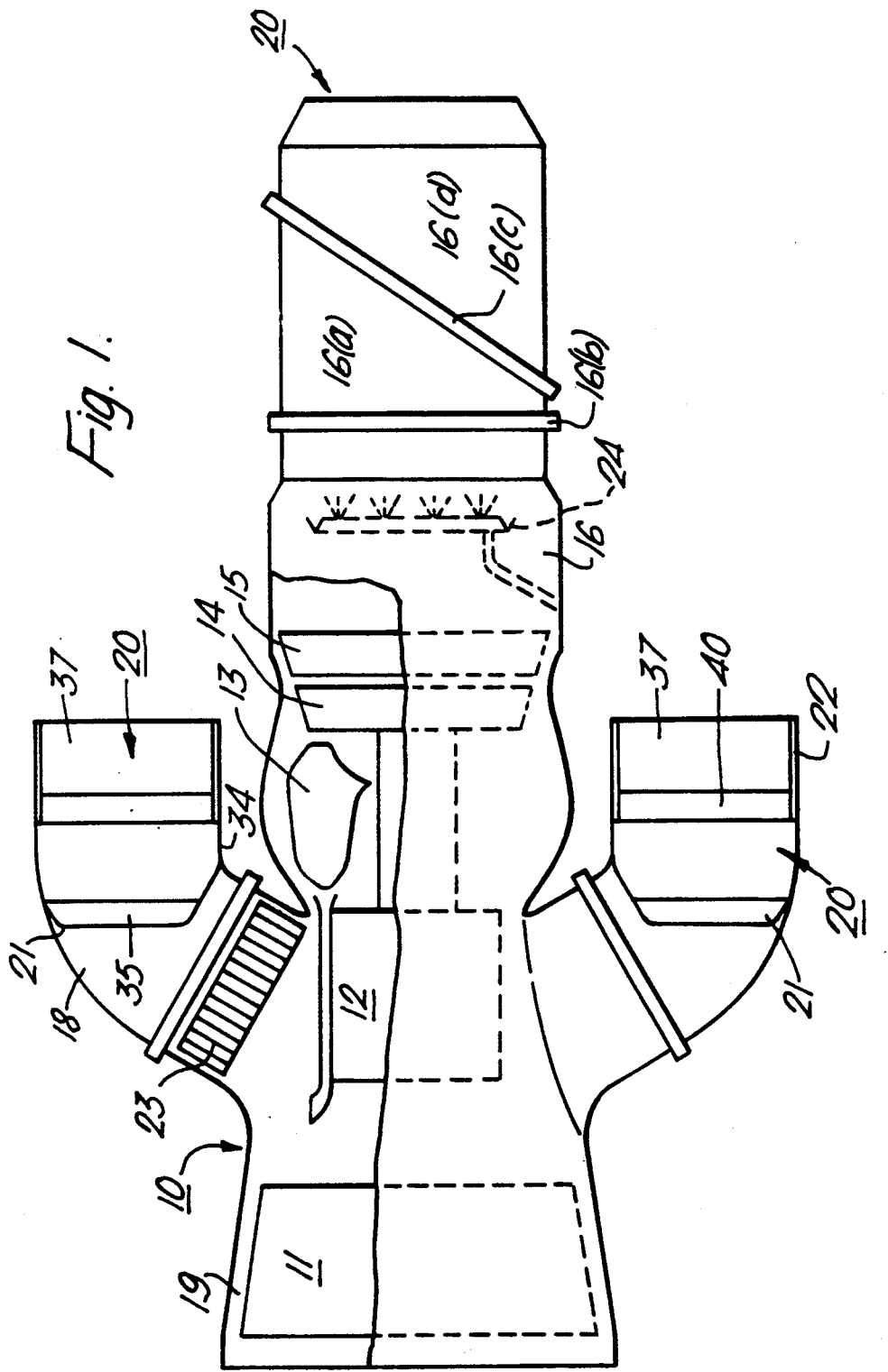
FIG. 1 illustrates schematically a gas turbine engine fitted with three vectorable variable area nozzles constructed according to the present invention.

Referring to FIG. 1 there is shown schematically a gas turbine aero engine 10 of the by-pass type, incorporating three vectorable nozzles. The engine comprises in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, and a jet pipe 16 terminating in a vectorable nozzle 17.

The L.P. compressor 11 supplies compressed air to the H.P. compressor 12 and to a plenum chamber 18 which forms part of the by-pass duct 19 and which terminates in two vectorable nozzles 20. The nozzles 20 are mounted in bearings 21 for rotation through an angle of approximately 110° about an axis 21A.

Additional combustion equipment 23 is provided in the plenum chamber 18 so that additional fuel can be burnt in the air stream ejected through the nozzles 20 to increase the thrust. To enable the engine to run efficiently the nozzles 20 are provided with variable area outlets and are constructed in accordance with the present invention. The area of the nozzles 20 can be selectively varied from a maximum area for supersonic flight with the additional combustion equipment 23 ignited (P.C.B.), to a minimum area for subsonic flight without P.C.B. (dry-mode).

Similarly the jet pipe 16 is provided with a re-heat system 24 and a variable area nozzle 17 constructed in accordance with the present invention. The jet pipe 16 terminates in what is commonly called a scarfed nozzle. That is to say the rear end of the jet pipe 16 comprises a first section 16a which is mounted in bearings 16b for rotation about the longitudinal axis of the jet pipe 16. The rear end of the first section 16a is scarfed, that is to say lies at an angle to the longitudinal axis and has a bearing 16(c) for supporting a second complementary scarfed section 16(d) of the jet pipe 16. By rotating the first section 16(a) about the longitudinal axis of the jet pipe 16 and simultaneously rotating the second section 16(d) in the plane of the scarfed joint relative to the first section 16(a) the nozzle can be swivelled from a direction pointing rearwards to a position pointing downwards.

The outlet area of the nozzle 17 can be varied from a maximum with the reheat system 24 ignited to a minimum area without the reheat system 24 ignited.

For convenience only one of the nozzles 20, will be described in greater detail, but it is to be understood that the variable area mechanism of the nozzle 17 is similar to that of the nozzles 20 except for the actual areas defined at the outlets.

Figure 2:
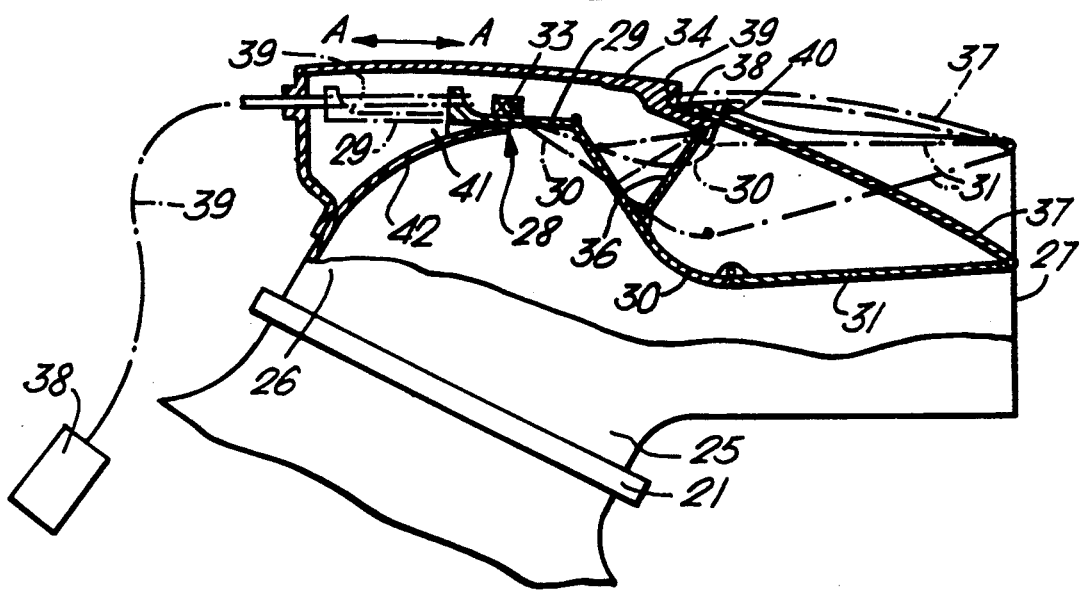
FIG. 2 illustrates in more detail a cross-sectional view of one of the nozzles of the engine of FIG. 1.

Referring in greater detail to FIG. 2 there is shown a nozzle 20 comprising a duct 25 mounted for rotation in bearings 21. The duct comprises a fixed portion 26 which blends from a right-circular cross-section at the plane of the bearing 21 to a substantially rectangular shaped cross-section in the plane of the nozzle outlet 27. Part of the outermost extent of the fixed portion 26, corresponding to one side of the rectangular cross-section, is cut away. Located downstream of the downstream edge 28 formed by the cut away portion, are three plates 29, 30, 31 which effectively define a movable part of the inner wall of the duct 25. The first plate 29 is constrained to slide in the direction of arrows (A) relative to the fixed portion 26, by guide ways 33. The guide ways 33 also provide the hoop strength to resist outward movement of the plate due to the pressure of air or combustion products flowing through the nozzle. The plate 29 may be a generally flat plate, or a plate which is curved to the approximate cross-sectional shape of the duct 25 at the edge 28. Preferably a seal is provided between the edge 28 and the plate 29.

The second plate 30 is pivotally attached to the downstream end of plate 29 and comprises a flat plate with its downstream edge bent outwards to provide a gradual lead into a throat which in use is formed by the plates 29, 30, 31.

An outer wall 34 is provided around at least the cut away part of the duct 25. The outerwall 34 includes a front bulkhead 35, and the wall 34 extends downstream beyond the downstream edge 28 of the duct 25.

A seal plate 36 is pivotally attached at one end to the outer wall 34 downstream of the edge 28 of the duct 25 and is pivotally attached at its other end to the second plate 30 at a region intermediate the upstream and downstream ends of the plate 30.

The third plate 31 is pivotally connected to the downstream end of the second plate 30 and comprises a generally flat plate.

Connected to the otherwise free end of plate 31 is a movable outer plate 37. The outer end of the plate 37 is constrained in a guide way so as to enable it to slide relative to the outer wall 34. The plate 37 is thus a movable continuation of the outer wall 34 and serves to reduce the base drag at the nozzle outlet. Stops 40 are provided to limit the forward and rearward movement of the outer end of plate 37.

An air motor 38 drives a lead screw 39 to move the plate 29 in the direction of the arrows (A) and this causes the plate 30 to rotate about its pivotal attachment to the seal plate 36 and also causes the seal plate 36 to rotate about its pivotal attachment to the outer wall 34. This in turn causes the plate 31 to rotate about its pivotal attachment to the plate 30 to take up a position dictated by the pressure of the gases flowing through the nozzle acting on the plate 31 and the position of the outer plate 39 against the stops 40.

The seal plate 36 together with the plates 29, 30, the outerwall 34 and the fixed portion 26 of the duct 25 define a pressurizable chamber 41 around the outside of the duct 25. Small openings 42 are provided in the duct wall to allow pressurized gases to flow from the interior of the nozzle into the chamber 41. The pressure in chamber 41 acts on the seal plates 36 and plates 29, 30 partially to counterbalance the pressure loads exerted on the plates 29, 30 by the gases flowing through the nozzles. The gas leakage paths between the plates 29, 30, 31 and between the seal plate 36 and the outerwall 34 and the plate 30 must be kept to as low as possible to ensure that the nozzle works efficiently. The pressure in chamber 41 reduces the forces needed to move the various plates 29, 30, 31 and enables a more robust nozzle to be made of lightweight construction.

If desired the plate 29 could be omitted and replaced by a hoop member in the plane of the upstream end of the panel 30. The hoop member would provide the strength to resist the plates 30,31 being forced outwards and the screw jack 39 would act directly on the hoop member. However, it is thought that such a construction would not be so good as that shown in FIG. 2 because of the possibility of turbulence, created by the gases flowing into the chamber 41 disrupting the efficient flow of gases through the nozzle.

As will be seen from the dotted lines the plates 30,31 can be selectively moved to form convergent, divergent or convergent-divergent nozzle profiles.

Figure 3:
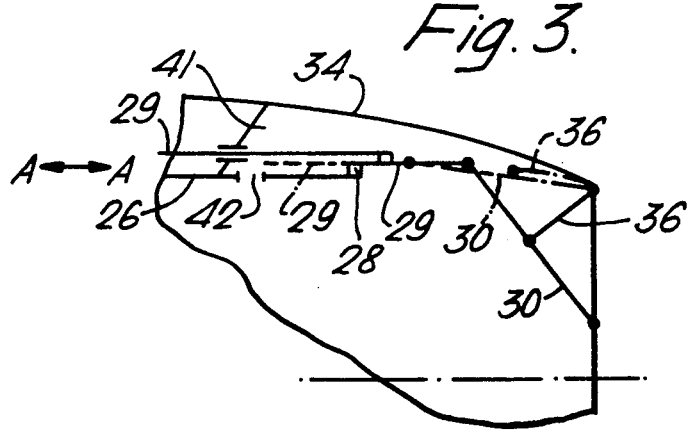
FIGS. 3 and 4 are schematic cross-sectional views of alternative nozzles to that shown in FIGS. 1 and 2, constructed in accordance with the present invention.

Referring to FIG. 3 there is shown an alternative construction of nozzle to that shown in FIG. 2. Components similar to the nozzle of FIG. 2 are given the same reference numeral.

The nozzle of FIG. 3 comprises a fixed portion 26 which is cut away as described above and two plates 29,30. The seal plate 36 is pivotally attached at one end to the wall 34 and at the other end to the plate 30 at a region intermediate its ends. Here again a pressurizable chamber 41 is formed by the outerwall 34, the plates 29,30 and the seal plate 36.

The plate 29 is pulled forward to cause the plate 30 00 to lie almost co-planar with the edge 28, as shown by the dotted lines for the maximum P.C.B. (or re-heat) area position. To reduce the area of the nozzle the plate 29 is moved rearwards to form a convergent nozzle (as shown).

Figure 4:
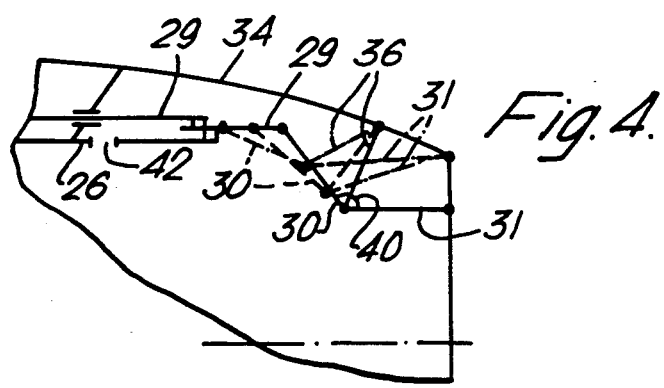

Referring to FIG. 4, there is shown an alternative nozzle which includes three plates 29,30,31 similar to those of the nozzle of FIG. 2 except that the downstream end of the third plate 31 is not connected by an outer plate to the outerwall 34 as in FIG. 2. Instead a stop 40 is provided to limit the minimum angle which the plate 31 assumes relative to the plate 30. In addition, the outer wall is continued downstream of the pivotal attachment of the seal plate 36 to the outerwall 34 to provide an edge against which the flap is urged. In operation, the maximum area is defined by pulling the plate 29 forwards (as shown) and the plate 31 engages the outer wall 34. By moving the plate 29 in a downstream direction the seal plate 36 pivots and moves the plates 30 and 31 to a position where they define a convergent-divergent nozzle (as shown dotted). In this position the plate 31 is urged outwardly by the pressure within the nozzle to engage the outerwall 34. Further movement of the plate 29 in the downstream direction causes the stop 40 to lift the plate 31 off the outerwall to define a convergent nozzle. If desired an outer plate (not shown) may be provided between the downstream end of the outerwall 34 and the otherwise free end of the plate 31 in much the same way as that shown in FIG. 2.

I claim:

1. A variable area nozzle for a turbo machine, comprising:

a duct;

a fixed plate forming a portion of at least one wall of said duct;

a first movable plate forming a further portion of said at least one wall, located adjacent to a downstream end of said fixed plate and mounted to be slidable relative to the fixed plate in a substantially longitudinal direction along the duct;

at least one additional movable plate forming a still further portion of said at least one wall, an upstream end of said at least one additional movable plate being pivotally mounted to a downstream end of said first movable plate;

an outer wall encompassing said movable plates and extending downstream beyond said downstream end of said fixed plate;

a seal plate having one end pivotally attached to said outer wall downstream of said downstream end of said fixed plate and another end pivotally attached to said at least one additional movable plate;

a pressurizable chamber on a side of said movable plates remote from an interior of said duct, said fixed plate, movable plates, outer wall and seal plate together comprising walls of said chamber;

means for admitting pressurized gas to the chamber, thereby at least partially to counterbalance pressure loads on said movable plates due to the pressure of any gasses flowing through said nozzle; and actuator means for moving said first movable plate in said longitudinal direction, thereby to cause said at least one additional movable plate and said seal plate to pivot and vary the area of the nozzle.

2. A nozzle according to claim 1 wherein the seal plate is attached to the at least one additional movable plate at a region intermediate the upstream and downstream edges of the at least one additional movable plate.

3. A nozzle according to claim 1 wherein said at least one additional movable plate comprises a second and a third movable plate, said third movable plate being pivotally attached at its upstream end to the downstream end of the second movable plate.

4. A nozzle according to claim 3 further comprising means for restricting the amount of pivotal movement of the third movable plate relative to the second movable plate.

5. A nozzle according to claim 3 wherein the seal plate is pivotally attached to the movable plates at a region adjacent the pivotal attachment of the third movable plate to the second movable plate.

6. A nozzle according to claim 3 further comprising a movable outer plate extending between the outer wall and the downstream end of the third movable plate to provide a continuation of the outer wall, said outer plate being slidably and pivotally mounted at its upstream end to the outer wall and pivotally attached at its downstream end to the downstream end of the third plate.

7. A nozzle according to claim 1 wherein the means for admitting pressurised gas to the chamber comprises an opening communicating with the inside of the duct.

8. A nozzle according to claim 1 further comprising a seal between the first movable plate and the fixed plate.

9. A nozzle according to claim 1 wherein the duct forms the downstream end of a vectorable nozzle of a gas turbine engine.

10. A nozzle according to claim 3 wherein there is provided a movable outer plate extending between the outer wall and the downstream end of the third movable plate to provide a continuation of the outer wall.

* * * * *